(12) United States Patent
Belelie et al.

(10) Patent No.: US 9,051,486 B2
(45) Date of Patent: *Jun. 9, 2015

(54) PHASE CHANGE INK COMPONENTS AND METHODS OF MAKING THE SAME

(71) Applicant: XEROX CORPORATION, Norwalk, CT (US)

(72) Inventors: Jennifer L. Belelie, Oakville (CA); Kentaro Morimitsu, Mississauga (CA); Naveen Chopra, Oakville (CA); Corey Tracy, Mississauga (CA); Stephan V. Drappel, Toronto (CA); Peter G. Odell, Mississauga (CA)

(73) Assignee: XEROX CORPORATION, Norwalk, CT (US)

(*) Notice: Subject to any disclaimer, the term of this patent is extended or adjusted under 35 U.S.C. 154(b) by 50 days.

This patent is subject to a terminal disclaimer.

(21) Appl. No.: 14/057,954

(22) Filed: Oct. 18, 2013

(65) Prior Publication Data

US 2014/0041546 A1 Feb. 13, 2014

Related U.S. Application Data

(60) Continuation of application No. 13/565,708, filed on Aug. 2, 2012, which is a division of application No. 13/095,591, filed on Apr. 27, 2011, now Pat. No. 8,308,859.

(51) Int. Cl.
*C09D 11/34* (2014.01)
*C09D 11/38* (2014.01)

(52) U.S. Cl.
CPC ............... *C09D 11/34* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 4,490,731 A | 12/1984 | Vaught | |
| 4,889,560 A | 12/1989 | Jaeger | |
| 4,889,761 A | 12/1989 | Titterington | |
| 5,195,430 A | 3/1993 | Rise | |
| 5,221,335 A | 6/1993 | Williams | |
| 5,231,135 A | 7/1993 | Machell | |
| 5,372,852 A | 12/1994 | Titterington | |
| 5,389,958 A | 2/1995 | Bui | |
| 5,621,022 A | 4/1997 | Jaeger | |
| 6,221,137 B1 | 4/2001 | King | |
| 6,472,523 B1 | 10/2002 | Banning | |
| 6,476,219 B1 | 11/2002 | Duff | |
| 6,544,591 B2 | 4/2003 | Slone et al. | |
| 6,576,747 B1 | 6/2003 | Carlini | |
| 6,576,748 B1 | 6/2003 | Carlini | |
| 6,590,082 B1 | 7/2003 | Banning | |
| 6,646,111 B1 | 11/2003 | Carlini | |
| 6,663,703 B1 | 12/2003 | Wu | |
| 6,673,139 B1 | 1/2004 | Wu | |
| 6,696,552 B2 | 2/2004 | Mayo | |
| 6,713,614 B2 | 3/2004 | Carlini | |
| 6,726,755 B2 | 4/2004 | Titterington | |
| 6,755,902 B2 | 6/2004 | Banning | |
| 6,821,327 B2 | 11/2004 | Jaeger | |
| 6,958,406 B2 | 10/2005 | Banning | |
| 7,053,227 B2 | 5/2006 | Jaeger | |
| 7,381,831 B1 | 6/2008 | Banning | |
| 7,427,323 B1 | 9/2008 | Birau | |
| 8,287,632 B1 | 10/2012 | Morimitsu | |
| 8,328,924 B2 | 12/2012 | Morimitsu | |
| 8,372,189 B2 | 2/2013 | Chopra | |
| 8,460,447 B2 | 6/2013 | Carlini | |
| 8,465,579 B2 * | 6/2013 | Morimitsu et al. | 106/31.61 |
| 8,500,260 B2 | 8/2013 | Carlini | |
| 8,500,896 B2 | 8/2013 | Morimitsu | |
| 8,506,040 B2 * | 8/2013 | Belelie et al. | 347/20 |
| 8,506,694 B2 | 8/2013 | Odell | |
| 8,647,423 B2 * | 2/2014 | Iftime et al. | 106/31.29 |
| 8,784,547 B2 * | 7/2014 | Vanbesien et al. | 106/31.29 |
| 8,894,762 B2 * | 11/2014 | Turek et al. | 106/31.29 |
| 2008/0302272 A1 | 12/2008 | Allen et al. | |
| 2012/0274698 A1 | 11/2012 | Morimitsu | |
| 2012/0274700 A1 | 11/2012 | Belelie | |
| 2012/0274716 A1 | 11/2012 | McConville | |
| 2012/0277462 A1 | 11/2012 | Enright | |
| 2012/0291663 A1 | 11/2012 | Belelie | |

OTHER PUBLICATIONS

State Intellectual Property Office of the People's Republic of China, First Office Action in re: Application Serial No. 201210127262.5 of Xerox Corporation; Date of Issue: Aug. 26, 2014; 11 pages.

* cited by examiner

*Primary Examiner* — Yun Qian

(74) *Attorney, Agent, or Firm* — Pillsbury Winthrop Shaw Pittman LLP

(57) ABSTRACT

A solid ink composition comprising an amorphous component, a crystalline material, and optionally, a colorant, which are suitable for ink jet printing, including printing on coated paper substrates, and methods for making the same. In embodiments, the crystalline and amorphous components are synthesized from an esterification reaction of tartaric acid with an alcohol.

16 Claims, 2 Drawing Sheets

PHASE CHANGE INK COMPONENTS AND METHODS OF MAKING THE SAME

CROSS REFERENCE TO RELATED APPLICATIONS

The present application is a continuation of U.S. patent application Ser. No. 13/565,708, filed Aug. 2, 2012, which is a divisional of U.S. patent application Ser. No. 13/095,591, filed Apr. 27, 2011.

Reference is made to commonly owned and co-pending, U.S. patent application Ser. No. 13/095,784 entitled "Solid Ink Compositions Comprising Amorphous Esters of Tartaric Acid" to Kentaro Morimitsu et al., electronically filed on the same day herewith; U.S. patent application Ser. No. 13/095,715 entitled "Solid Ink Compositions Comprising Crystalline Esters of Tartaric Acid" to Kentaro Morimitsu et al., electronically filed on the same day herewith; U.S. patent application Ser. No. 13/095,770 entitled "Phase Change Inks and Methods of Making the Same" to Kentaro Morimitsu et al., electronically filed on the same day herewith; U.S. patent application Ser. No. 13/095,636 entitled "Solid Ink Compositions Comprising Crystalline-Amorphous Mixtures" to Jennifer Belelie et al., electronically filed on the same day herewith; U.S. patent application Ser. No. 13/095,555 entitled "Phase Change Inks and Methods of Making the Same" to Naveen Chopra et al., electronically filed on the same day herewith; U.S. patent application Ser. No. 13/095,681 entitled "Solid Ink Compositions Comprising Crystalline-Amorphous Mixtures" to Jennifer Belelie et al., electronically filed on the same day herewith; U.S. patent application Ser. No. 13/095,795 entitled "Solid Ink Compositions Comprising Amorphous Esters of Citric Acid" to Kentaro Morimitsu et al., electronically filed on the same day herewith; U.S. patent application Ser. No. 13/095,038 entitled "Print Process for Phase Separation Ink" to Paul McConville et al., electronically filed on the same day herewith; U.S. patent application Ser. No. 13/095,015 entitled "Solventless Reaction Process" to Thomas Edward Enright et al., electronically filed on the same day herewith; U.S. patent application Ser. No. 13/095,028 entitled "Phase Change Ink" to Kentaro Morimitsu et al., electronically filed on the same day herewith; U.S. patent application Ser. No. 13/095,174 entitled "Next-Generation Solid Inks From Novel Oxazoline Compnents, Developed for Robust Direct-to-Paper Printing" to Rina Carlini et al., electronically filed on the same day herewith; U.S. patent application Ser. No. 13/095,221 entitled "Novel Components for a Next-Generation Robust Solid Ink" to Rina Carlini et al., electronically filed on the same day herewith; and U.S. patent application Ser. No. 13/095,043 entitled "Phase Separation Ink" to Peter G. Odell et al., electronically filed on the same day herewith, the entire disclosures of which are incorporated herein by reference in its entirety.

BACKGROUND

The present embodiments relate to solid ink compositions characterized by being solid at room temperature and molten at an elevated temperature at which the molten ink is applied to a substrate. These solid ink compositions can be used for ink jet printing. The present embodiments are directed to a novel solid ink composition comprising an amorphous component, a crystalline material, and optionally a colorant, and methods of making the same.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

While the above conventional solid ink technology is generally successful in producing vivid images and providing economy of jet use and substrate latitude on porous papers, such technology has not been satisfactory for coated paper. Thus, while known compositions and processes are suitable for their intended purposes, a need remains for additional means for forming images or printing on coated paper substrates. As such, there is a need to find alternative compositions to provide customers with excellent image robustness on all substrates.

Each of the foregoing U.S. patents and patent Publications are incorporated by reference herein. Further, the appropriate components and process aspects of the each of the foregoing U.S. patents and patent Publications may be selected for the present disclosure in embodiments thereof.

SUMMARY

According to embodiments illustrated herein, there is provided novel solid ink compositions comprising crystalline and amorphous materials synthesized from tartaric acid suitable for ink jet printing, including printing on coated paper substrates. The crystalline and amorphous components can be both synthesized as esters of tartaric acid. However, the crystalline and amorphous components are synthesized from different ester reagents to achieve resulting products that are either crystalline or amorphous.

In particular, the present embodiments provide a phase change ink component comprising: esters of tartaric acid having a formula of

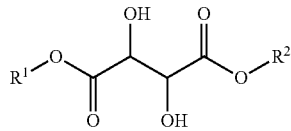

wherein $R^1$ and $R^2$ each, independently of the other or meaning that they can be the same or different, is an alkyl group, and further wherein the alkyl portion can be straight, branched or cyclic, saturated or unsaturated, substituted or unsubstituted, having from 1 to about 40 carbon atoms, an substituted or unsubstituted aromatic or heteroaromatic group, and mixtures thereof, and further wherein tartaric acid backbone is selected from L-(+)-tartaric acid, D-(−)-tartaric acid, DL-tartaric acid, mesotartaric acid, and mixtures thereof.

In further embodiments, there is provided a method of preparing a phase change ink comprising: providing a crystalline component in a molten state; providing an amorphous component in a molten state; stirring the crystalline and amorphous component together to form a mixture; and cooling the mixture to obtain the phase change ink, wherein the crystalline and amorphous components are esters of tartaric acid.

In yet other embodiments, there is provided a method of preparing a phase change ink comprising: providing a crystalline component in a molten state; providing an amorphous component in a molten state; stirring the crystalline and amorphous component together to form a mixture; and cooling the mixture to obtain the phase change ink, wherein the crystalline and amorphous components are esters of tartaric acid produced by an esterification reaction with an alcohol.

BRIEF DESCRIPTION OF THE DRAWINGS

For a better understanding of the present embodiments, reference may be had to the accompanying figures.

DETAILED DESCRIPTION

Figure 1:
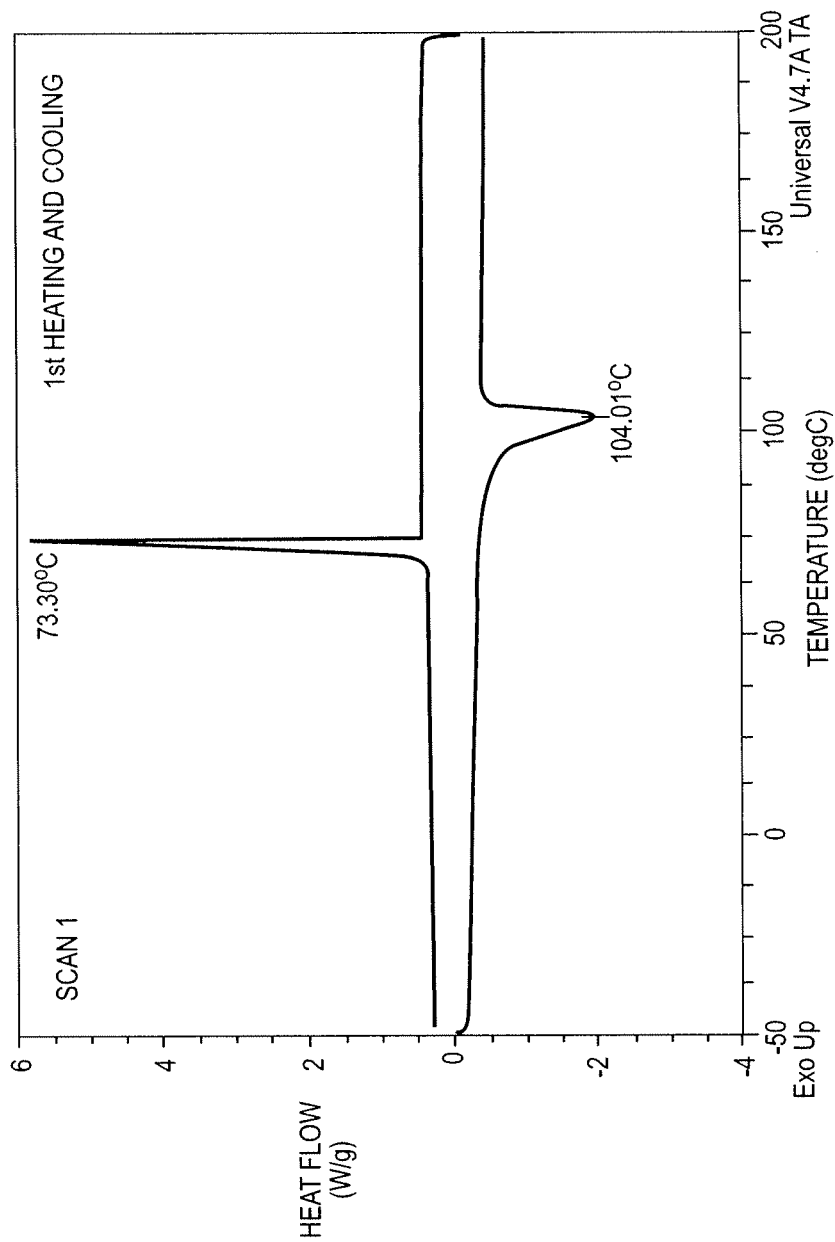
FIG. 1 is differential scanning calorimetry (DSC) data of an inventive ink comprising diphenethyl L-tartrate (DPT):di-DL-menthyl L-tartrate (DMT) (70:30 weight percent) confirming desirable properties according to the present embodiments (the DSC data was obtained on a Q1000 Differential Scanning calorimeter (TA Instruments) at a rate of 10° C./min from −50 to 200 to −50° C.)

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid at room temperature (RT) (e.g., 20-27° C.) and molten at an elevated temperature at which the molten ink is applied to a substrate. As discussed above, while current ink options are successful for porous paper substrates, these options are not always satisfactory for coated paper substrates.

It has been discovered that using a mixture of crystalline and amorphous components in solid ink formulations provides robust inks, and in particular, solid inks which demonstrate robust images on coated paper. Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (140° C.). In the present embodiments, however, it is discovered that a robust solid ink can be obtained through a blend of crystalline and amorphous components.

The present embodiments provide a new type of solid ink composition for ink jet printing which comprises a blend of (1) crystalline and (2) amorphous components, generally in a weight ratio of from about 50:50 to about 95:5, or 60:40 to about 95:5, respectively. In more specific embodiments, the weight ratio of the crystalline to amorphous component is from about 65:35 to about 95:5, or is from about 70:30 to about 90:10. Generally, the amorphous component has the following structure:

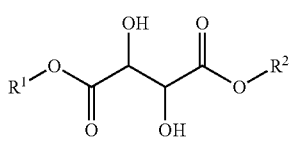

wherein $R^1$ and $R^2$ each, independently of the other or meaning that they can be the same or different, is an alkyl group, and further wherein the alkyl portion can be straight, branched or cyclic, saturated or unsaturated, substituted or unsubstituted, having from 1 to about 40 carbon atoms, or an substituted or unsubstituted aromatic or heteroaromatic group, and mixtures thereof. Generally, the crystalline component has the following structure:

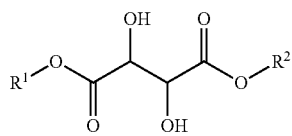

wherein $R^1$ and $R^2$ each, independently of the other or meaning that they can be the same or different, is an alkyl group, and further wherein the alkyl portion can be straight, branched or cyclic, saturated or unsaturated, substituted or unsubstituted, having from 1 to about 40 carbon atoms, or an substituted or unsubstituted aromatic or heteroaromatic group, and mixtures thereof.

The crystalline and amorphous materials are generally synthesized by esterification reactions of tartaric acid although the compounds can be obtained by any suitable reaction. For both amorphous and crystalline components, tartaric acid is selected from L-(+)-tartaric acid, D-(−)-tartaric acid, DL-tartaric acid, mesotartaric acid, and mixtures thereof. The identity of the endcap greatly influences the final properties of the tartrate. For example, in specific embodiments, addition of phenethyl alcohol to tartaric acid in an esterification reaction provided a crystalline ink component while addition of menthol to tartaric acid in the esterification reaction provided an amorphous ink component.

Resulting inks incorporating a blend of these amorphous and crystalline tartaric acid derivatives demonstrate excellent robustness on uncoated and coated substrates.

In specific embodiments, the crystalline component is selected from the group consisting of dibenzyl L-tartrate, diphenethyl L-tartrate (DPT), bis(3-phenyl-1-propyl) L-tartrate, bis(2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, dicyclohexyl L-tartrate, bis(4-tert-butylcyclohexyl) L-tartrate, and any stereoisomers and mixtures thereof. In specific embodiments, the amorphous component is selected from the group consisting of di-L-menthyl L-tartrate, di-DL-menthyl L-tartrate, di-L-menthyl DL-tartrate, di-DL-menthyl DL-tartrate, and any stereoisomers and mixtures thereof. Each component imparts specific properties to the solid inks. The crystalline component in the ink formulation drives the phase change through rapid crystallization on cooling. The crystalline component also sets up the structure of the final ink film and creates a hard ink by reducing the tackiness of the amorphous component. The amorphous components provide tackiness and impart robustness to the printed ink.

The present embodiments provide crystalline materials which are suitable for ink jet solid ink. The crystalline materials are generally synthesized by an esterification reaction of tartaric acid, although other suitable reactions can be used. These materials have a melting temperature ($T_{melt}$) of less than 150° C., or from about 65 to about 150° C., or from about 66 to about 145° C., a crystallization temperature ($T_{crys}$) of greater than 60° C., or from about 60 to about 140° C., or from about 65 to about 120° C. and viscosity at about 140° C. of less than 10 centipoise (cps), or from about 0.5 to about 10 cps, or from about 1 to about 10 cps. At room temperature (RT), the suitable materials are in crystalline form and have a viscosity of greater than $10^6$ cps.

In embodiments, the crystalline materials are formulated with an amorphous material to form a solid ink composition. The amorphous materials are also generally synthesized by an esterification reaction of tartaric acid, although any suitable reaction conditions can be used. These materials show no crystallization by DSC at a rate of 10° C./min from −50 to 200 to −50° C., relatively low viscosity (<$10^2$ cps, or from about 1 to about 100 cps, or from about 5 to about 95 cps) at about 140° C. and high viscosity (>$10^6$ cps) at room temperature. In embodiments, the amorphous materials are formulated with a crystalline material to form a solid ink composition.

The resulting ink compositions comprising a blend of the crystalline and amorphous components show good rheological profiles and improved performance in inks. Image samples created by the solid ink composition on coated paper by K-proof demonstrated remarkable robustness. Furthermore, using tartaric acid as an ester base has additional advantages of being low cost, and being obtained from a potential bio-derived ("green") source.

A K-printing proofer is a common test fixture in a print shop. In this case, the K-printing proofer has been modified to heat the printing plate to melt the solid ink. The K-printing proofer used has three rectangular gravure patterns each approximately 9.4×4.7 cm. The cell density of the first rectangle is nominally 100%, the second 80%, and the third 60%. In practice this K-printing proof plate results in films (or pixels) of about 5 microns in thickness (or height). Test ink is spread over the heated gravure plate and a test print is made by passing a wiping blade across the plate surface immediately followed by a rubber roll upon which a test paper has been secured. As the paper roll passes ink is transferred from the gravure cells to the paper.

In the present embodiments, the solid ink composition is obtained by using novel crystalline and amorphous materials synthesized from tartaric acid and simple alcohols in esterification reactions. The solid ink composition may comprise the crystalline and amorphous material in combination with a colorant. The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present esters of tartaric acid, which provide both crystalline and amorphous components for the solid inks, have been discovered to produce robust inks having desirable rheological profiles and that meet the many requirements for ink jet printing.

The ink composition, in specific embodiments, further comprises a colorant, which may be a pigment or dye, present in the ink composition in an amount of from about 0.1 percent to about 50 percent by weight, or from about 0.2 percent to about 20 percent by weight of the total weight of the ink composition.

The crystalline component is present in an amount of from about 60 percent to about 95 percent by weight, or from about 65 percent to about 95 percent by weight of the total weight of the ink composition. The amorphous component is present in an amount of from about 5 percent to about 40 percent by weight, or from about 5 percent to about 35 percent by weight of the total weight of the ink composition.

In embodiments, the resulting solid ink has a viscosity of from about 1 to about 14 cps, or from about 2 to about 13 cps, or from about 3 to about 12 cps, at a temperature of about 140° C. In embodiments, the solid ink has a viscosity of at least about $10^6$ cps at room temperature. In embodiments, the solid ink has a $T_{melt}$ of from about 65 to about 140° C., or from about 65 to about 135° C., from about 70 to about 130° C. and a $T_{crys}$ of from about 65 to about 140° C., or from about 66 to about 130° C., from about 67 to about 125° C., as determined by DSC at a rate of 10° C./min.

The Crystalline Component

The ink composition of the present embodiments comprises a crystalline component. Tartaric acid was reacted with a variety of alcohols to make di-esters as shown in the synthesis scheme below, which illustrates the preparation of a tartaric acid di-ester compound of the present embodiments.

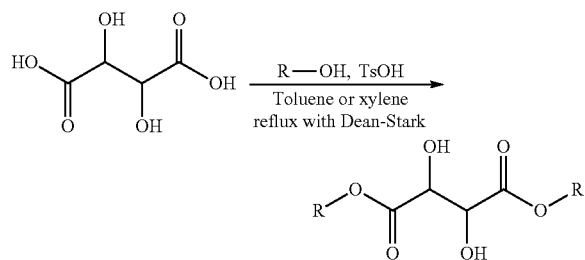

The esterification was conducted by a one-step reaction. Out of ten different alcohols reacted (benzyl alcohol, phenethyl alcohol, 2-phenoxyethanol, 3-phenyl-1-propanol, 4-methylbenzyl alcohol, 4-methoxyphenol, cyclohexanol, cyclopentanol, 4-tert-butylcyclohexanol, 3,5,5-trimethyl-1-hexanol), phenethyl alcohol was identified as the best material to form a stable crystalline component with suitable physical properties. Di-esters of 3,5,5-trimethyl-1-hexanol and cyclopentanol were viscous liquids at room temperature and the rest of the synthesized di-esters were crystals. Suitable alcohols to be used in the esterification with the present embodiments may be selected from the group consisting of alkyl alcohol, wherein the alkyl portion can be straight, branched or cyclic, saturated or unsaturated, substituted or unsubstituted, having from 1 to about 40 carbon atoms, or an substituted or unsubstituted aromatic or heteroaromatic group, and mixtures thereof. In embodiments, two or more molar equivalents of alcohol may be used in the reaction to produce the di-esters of tartaric acid. If one molar equivalent of alcohol is used, the result is mostly mono-esters.

The Amorphous Component

The ink composition of the present embodiments comprises an amorphous component. Tartaric acid was reacted with a variety of alcohols to make di-esters as shown in the synthesis scheme below, which illustrates the preparation of a tartaric acid di-ester compound of the present embodiments. A variety of alcohols may be used in the esterification such as, for example, menthol, isomenthol, neomenthol, isoneomenthol, and any stereoisomers and mixtures thereof.

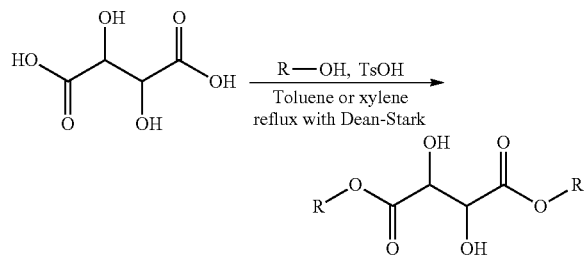

Esterification was conducted by a one-step reaction. Menthol was the alcohol selected for the experimental data. Both tartaric acid and menthol have stereoisomers, therefore there are many possible combinations in terms of chirality. Three combinations of tartaric acid and menthol (di-L-menthyl L-tartrate, di-DL-menthyl L-tartrate, di-L-menthyl DL-tartrate) were synthesized. Surprisingly, all combinations, even in the combination of optically pure L-menthol and L-tartaric acid, made amorphously setting materials which showed no crystallization. Suitable alcohols to be used with the present embodiments may be selected from the group consisting of alkyl alcohol, wherein the alkyl portion can be straight, branched or cyclic, saturated or unsaturated, substituted or unsubstituted, having from 1 to about 40 carbon atoms, or a substituted or unsubstituted aromatic or heteroaromatic group, and mixtures thereof. In embodiments, two or more molar equivalents of alcohol may be used in the reaction to produce the di-esters of tartaric acid. If one molar equivalent of alcohol is used, the result is mostly mono-esters.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich), 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich), α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich), 3-(2H-benzotriazol-2-yl)-4-hydroxy phenethylalcohol (Aldrich); NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In embodiments, the phase change ink compositions described herein also include a colorant. The ink of the present embodiments can thus be one with or without colorants. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR(C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like. The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

In embodiments, the ink carriers for the phase change inks may have melting points of between from about 65° C. to about 150° C., for example between from about 70° C. to about 140° C., from about 75° C. to about 135° C., from about 85° C. to about 125° C. as determined by, for example, by DSC at a rate of 10° C./min. Furthermore, these inks have a viscosity of about 1 to about 13 cps, such as from about 2 to about 13 cps, or from about 4 to about 12 cps, at a temperature of about 140° C. The ink compositions can be prepared by any desired or suitable method. For example, each of the components of the ink carrier can be mixed together, followed by heating the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus or other high energy mixing equipment to affect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Diphenethyl L-Tartrate

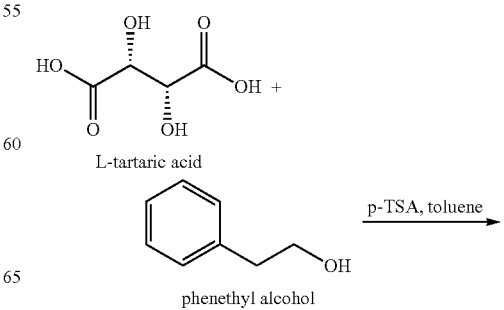

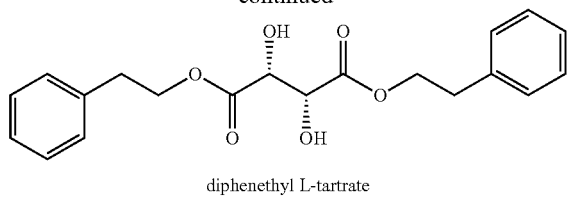

diphenethyl L-tartrate

In a typical synthesis of, for example, diphenethyl L-tartrate (DPT), L-tartaric acid (9.0 g, 60 mmol), phenethyl alcohol (22.0 g, 180 mmol), and toluene (120 ml) were added to a 500 ml flask, equipped with a Dean-Stark trap, to give a suspension. p-Toluenesulfonic acid monohydrate (0.14 g, 0.75 mmol) was added and the mixture was refluxed for 17 hours with azeotropic removal of water. The reaction mixture was cooled down to room temperature and washed with NaHCO₃ aq. (2×) and brine (1×), then dried over MgSO₄. After filtration and removal of the solvent, the residue was recrystallized from toluene to obtain 16.9 g (79% yield) of white crystals. The sample was characterized by $^1$H NMR and acid number analysis (4.06 mgKOH/g).

Table 1 shows the thermal and rheological properties of DPT confirming DPT as a good candidate for a crystalline material.

TABLE 1

| Property | Desired Range | Value |
|---|---|---|
| $T_{melt}$* | <140° C. | 110° C. |
| $T_{crys}$* | >65° C. | 83° C. |
| η at 140° C.** | <10 cps | 4.7 cps |

*The DSC data was obtained on a Q1000 Differential Scanning Calorimeter (TA Instruments) at a rate of 10° C./min from −50 to 200 to −50° C.
**The rheology was measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

Preparation of Di-L Menthyl L-Tartrate

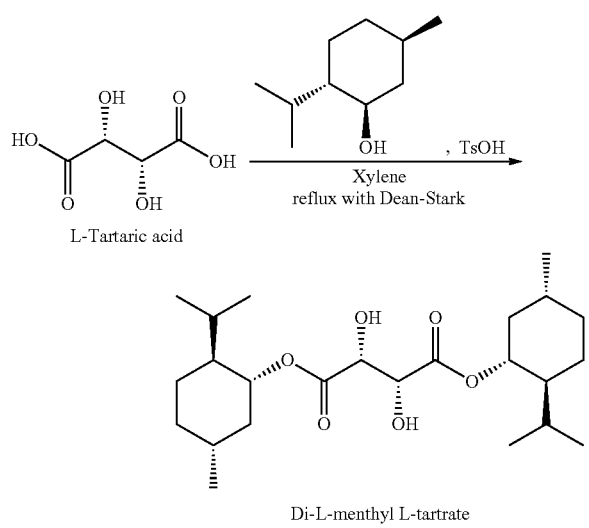

Di-L-menthyl L-tartrate

In a typical synthesis of, for example, di-L-menthyl L-tartrate (DMT), L-tartaric acid (18.0 g, 120 mmol), L-menthol (37.5 g, 240 mmol), and xylene (240 ml) were added to a 500 ml flask, equipped with a Dean-Stark trap, to give a suspension. p-Toluenesulfonic acid monohydrate (0.29 g, 1.5 mmol) was added and the mixture was refluxed for 18 hours with azeotropic removal of water. The reaction mixture was cooled down to room temperature and washed with 10 wt % KOH aq. (1×) and brine (2×), then dried over MgSO₄. After filtration and removal of the solvent, the residue was dried under vacuum with stirring at 120° C. to obtain 34.9 g (68% yield) of amorphous solid. The sample was characterized by $^1$H NMR and acid number analysis (1.23 mgKOH/g).

Table 2 shows the thermal and rheological properties of DMT confirming DMT as a good candidate for an amorphous material.

TABLE 2

| | | Value | | |
|---|---|---|---|---|
| Property | Desired Range | di-L-menthyl L-tartrate | di-L-menthyl DL-tartrate | di-DL-mentyl L-tartrate |
| $T_g$* | 10-50° C. | 19° C. | 18° C. | 13° C. |
| η at 140° C.** | <10² cps | 10 cps | 10 cps | 10 cps |

*The DSC data was obtained on a Q1000 Differential Scanning Calorimeter (TA Instruments) at a rate of 10° C./min from −50 to 200 to −50° C.
**The rheology was measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

Preparation of Solid Ink 1

DPT (crystalline component) (3.5 g) and DMT (amorphous component) (1.5 g) were stirred in the molten state at 140° C. for 30 minutes, then cooled down to obtain Ink 1. Table 3 shows the thermal and rheological properties of Ink 1.

TABLE 3

| Property | Desired Range | Value |
|---|---|---|
| $T_{melt}$* | <140° C. | 104° C. |
| $T_{crys}$* | >65° C. | 73° C. |
| η at 140° C.** | <11 cps | 5.2 cps |
| η at RT** | >10⁶ cps | >10⁶ cps |

*The DSC data was obtained on a Q1000 Differential Scanning Calorimeter (TA Instruments) at a rate of 10° C./min from −50 to 200 to −50° C.
**The rheology was measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

Figure 2:
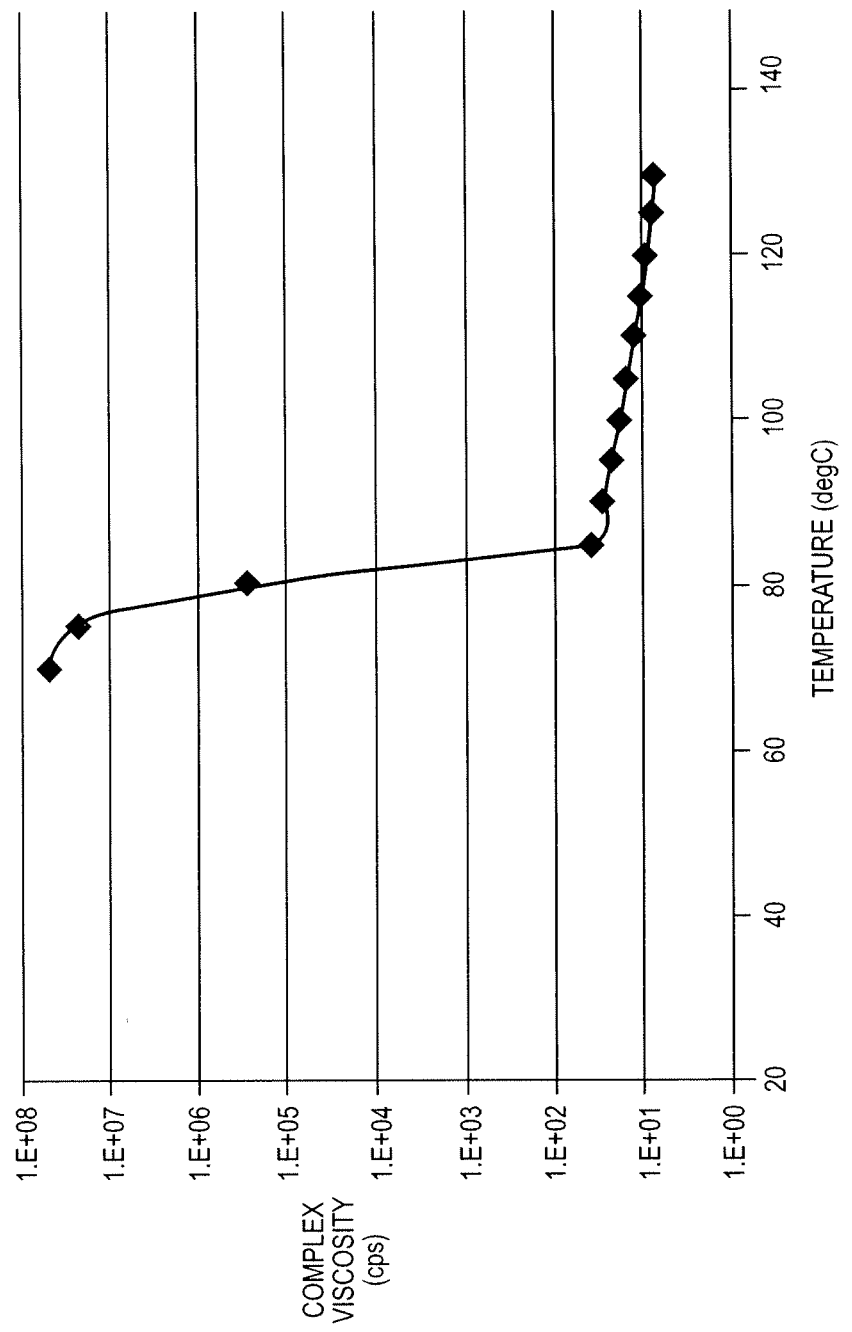
FIG. 2 is a graph illustrating rheology data of DPT:DMT (70:30 weight percent) confirming desirable properties according to the present embodiments. All of the rheology measurements were made on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

As shown in FIG. 1, DSC analysis of Ink 1 revealed $T_{melt}$ to be 104° C. and $T_{crys}$ to be 73° C., which are in the desired ranges (see Table 3). FIG. 2 shows the rheology profile of Ink 1. Ink 1 had a viscosity of 5.2 cps at 140° C. and phase transitioned to >10⁶ cps at around 85° C. These values are in the desired ranges, but can be adjusted by altering the ratio of the amorphous and crystalline components.

Print Performance

A colorant was further added to the ink. DPT (crystalline component) (3.40 g) and DMT (amorphous component) (1.45 g) were stirred in the molten state at 140° C. for 30 minutes, after which time Orasol Blue GN dye (0.15 g) was added portionwise. The colored ink was stirred for an additional hour before cooling to room temperature.

The ink was subsequently coated using a K-printing proofer (manufactured by RK Print Coat Instrument Ltd., Litlington, Royston, Heris, SG8 0OZ, U.K.) onto Xerox digital Color Elite Gloss, 120 gsm (DCEG) to form robust images that could not be easily removed from the substrate.

When a scratch/gouge finger with a curved tip at an angle of about 15° from vertical, with a weight of 528 g applied, was drawn across the image at a rate of approximately 13 mm/s no ink was visibly removed from the image. The scratch/gouge tip is similar to a lathe round nose cutting bit with radius of curvature of approximately 12 mm.

SUMMARY

In summary, the present embodiments provide solid ink formulations developed for ink jet printing which contains at least one crystalline material and at least one amorphous material. The inks may also include a colorant, such as a pigment or dye. The novel crystalline and amorphous materials are synthesized from tartaric acid and an alcohol, such as phenethyl alcohol or menthol, by esterification reactions. The resulting crystalline and amorphous materials have desirable physical properties which provide for robust inks.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
   a crystalline material of an ester of tartaric acid having a formula of

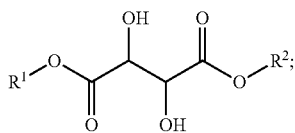

and
   an amorphous material of an ester of tartaric acid having a formula of

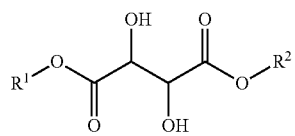

wherein each $R^1$ and each $R^2$ in each of the crystalline material formula and the amorphous material formula, is independently, an alkyl group, and further wherein the alkyl portion can be straight, branched or cyclic, saturated or unsaturated, substituted or unsubstituted, having from 1 to 40 carbon atoms, an substituted or unsubstituted aromatic or heteroaromatic group, and mixtures thereof, and further wherein each tartaric acid backbone of the crystalline material formula and the amorphous material formula, is independently, selected from L-(+)-tartaric acid, D-(−)-tartaric acid, DL-tartaric acid, mesotartaric acid, and mixtures thereof, and further wherein the crystalline material has a viscosity of from 1 to 10 cps at a temperature of 140° C. and the amorphous material has a viscosity of from 1 to 100 cps at a temperature of 140° C.

2. The phase change ink of claim 1, wherein the crystalline material selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis (4-methylphenyl) L-tartrate, bis(4-methoxylphenyl) L-tartrate, bis(4-methylbenzyl) L-tartrate, bis(4-methoxyl benzyl) L-tartrate, dicyclohexyl L-tartrate, bis(4-tert-butyl-cyclohexyl) L-tartrate, and any stereoisomers and mixtures thereof.

3. The phase change ink of claim 2, wherein the crystalline material comprises diphenethyl L-tartrate.

4. The phase change ink of claim 1, wherein the amorphous material selected from the group consisting of di-L-menthyl L-tartrate, di-DL-menthyl L-tartrate, di-L-menthyl DL-tartrate, di-DL-menthyl DL-tartrate, and any stereoisomers and mixtures thereof.

5. The phase change ink of claim 4, wherein the amorphous material comprises di-L-menthyl DL-tartrate.

6. The phase change ink of claim 1, wherein the amorphous material having a viscosity of from 5 to 95 cps at a temperature of 140° C.

7. The phase change ink of claim 1, wherein the amorphous material having a viscosity of at least $10^5$ cps at room temperature.

8. The phase change ink of claim 7, wherein the amorphous material having a viscosity of at least $10^6$ cps at room temperature.

9. The phase change ink of claim 1, wherein the crystalline material is present in the ink in an amount of from 60 percent to 95 percent by weight of the total weight of the ink.

10. The phase change ink of claim 1, wherein the amorphous material is present in the ink in an amount of from 5 percent to 40 percent by weight of the total weight of the ink.

11. The phase change ink of claim 1, wherein the weight ratio of the crystalline to amorphous material is from 50:50 to 95:5.

12. The phase change ink of claim 1 further comprising a colorant.

13. The phase change ink of claim 1 having a viscosity of from 1 to 14 cps at a temperature of 140° C.

14. A phase change ink comprising:
   a crystalline material selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis(4-methylphenyl) L-tartrate, bis (4-methoxylphenyl) L-tartrate, bis(4-methylbenzyl) L-tartrate, bis(4-methoxylbenzyl) L-tartrate, dicyclohexyl L-tartrate, bis(4-tert-butylcyclohexyl) L-tartrate, and any stereoisomers and mixtures thereof; and
   an amorphous material selected from the group consisting of di-L-menthyl L-tartrate, di-DL-menthyl L-tartrate, di-L-menthyl DL-tartrate, di-DL-menthyl DL-tartrate, and any stereoisomers and mixtures thereof, and further wherein the crystalline material has a viscosity of from 1 to 10 cps at a temperature of 140° C. and the amorphous material has a viscosity of from 1 to 100 cps at a temperature of 140° C.

15. The phase change ink of claim 14, wherein the crystalline material is present in the ink in an amount of from 60 percent to 95 percent by weight of the total weight of the ink.

16. The phase change ink of claim 14, wherein the amorphous material is present in the ink in an amount of from 5 percent to 40 percent by weight of the total weight of the ink.

* * * * *